(No Model.)

A. MATSON.
PLANTER.

No. 550,188.

2 Sheets—Sheet 1.

Patented Nov. 19, 1895.

WITNESSES:
Chas Niola
Jno. L. Acker

INVENTOR
A. Matson
BY
Munn & Co
ATTORNEYS.

(No Model.) 2 Sheets—Sheet 2.

A. MATSON.
PLANTER.

No. 550,188. Patented Nov. 19, 1895.

WITNESSES:
Chas. Nida
Fred Acker

INVENTOR
A. Matson
BY
Munn & Co
ATTORNEYS.

ANDREW B.GRAHAM, PHOTO-LITHO, WASHINGTON, D.C.

UNITED STATES PATENT OFFICE.

ANDERS MATSON, OF MOLINE, ILLINOIS.

PLANTER.

SPECIFICATION forming part of Letters Patent No. 550,188, dated November 19, 1895.

Application filed October 25, 1894. Serial No. 526,950. (No model.)

*To all whom it may concern:*

Be it known that I, ANDERS MATSON, of Moline, in the county of Rock Island and State of Illinois, have invented a new and Improved Planter, of which the following is a full, clear, and exact description.

My invention relates to an improvement in planters, especially to an improvement in corn-planters; and the objects of the invention are to provide a machine which will automatically drop corn at regular intervals, and to provide a means whereby the dropping mechanism may be adjusted to drop in drills and at desired distances apart, and whereby, further, the dropping mechanism may be adjusted to drop one seed or as many as may be desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
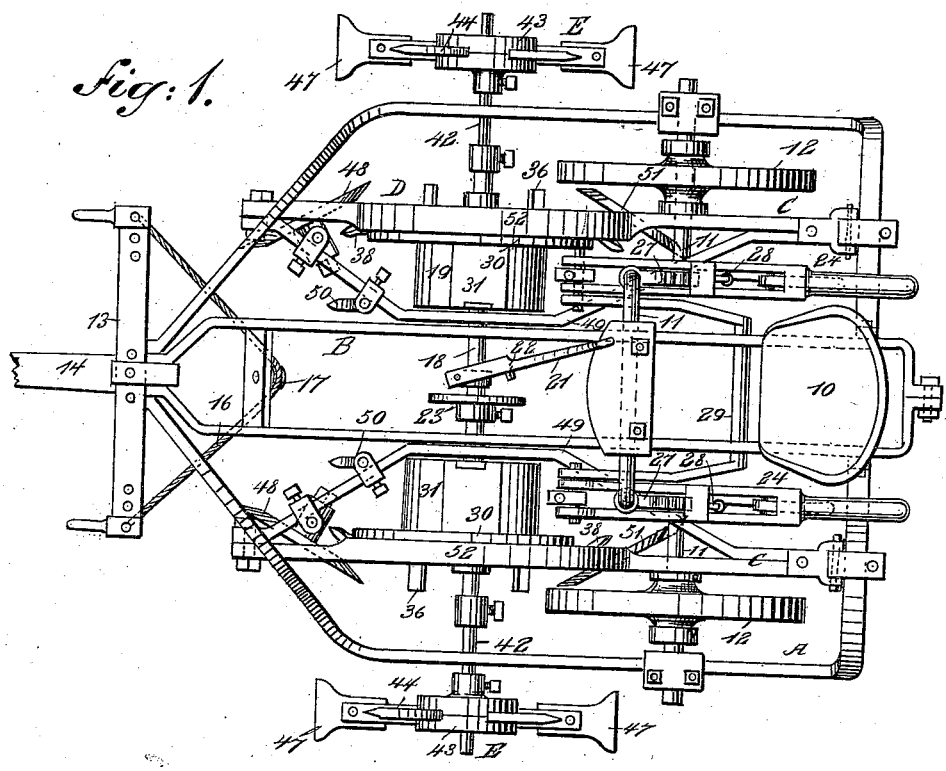
Figure 2:
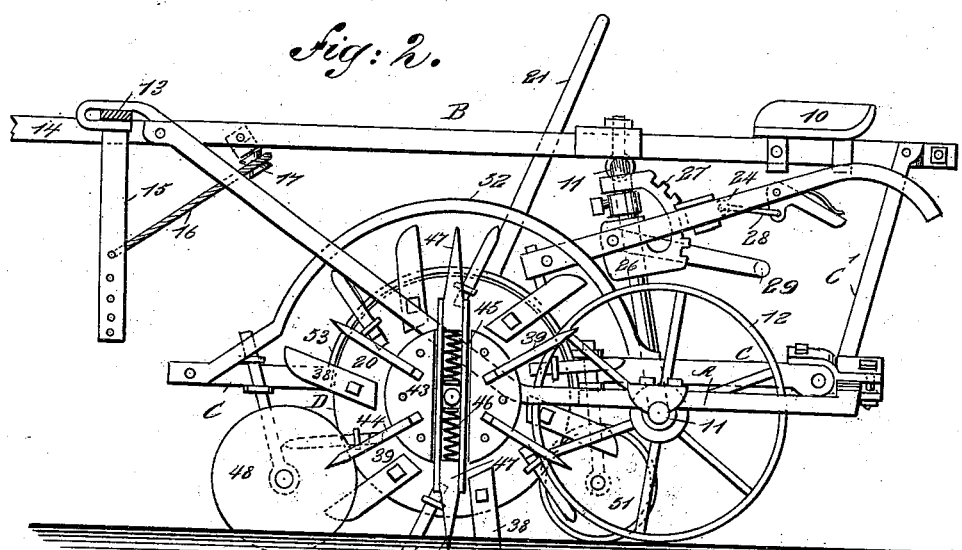
Figure 3:
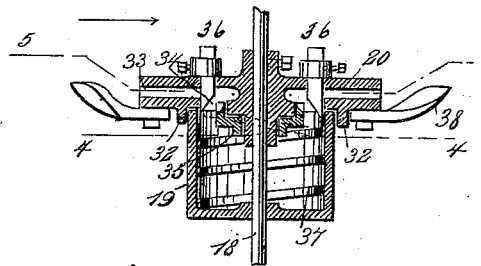
Figure 6:
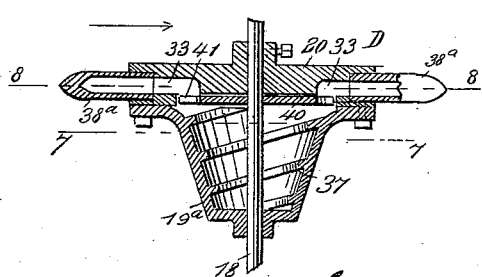
Figure 4:
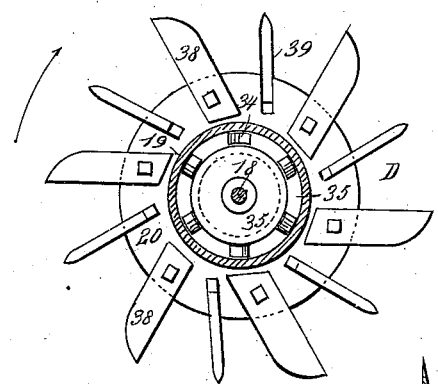
Figure 7:
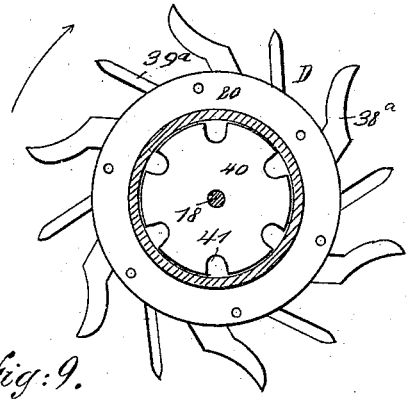
Figure 5:
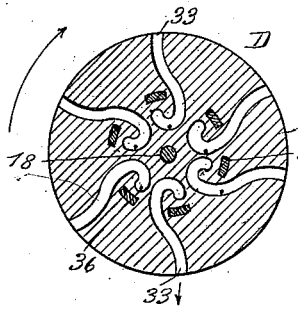
Figure 9:
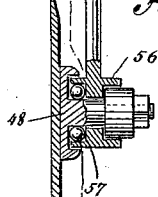
Figure 8:
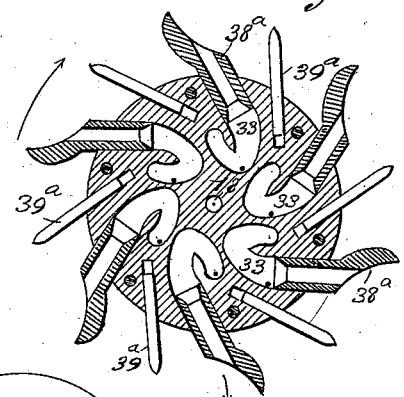
Figure 10:
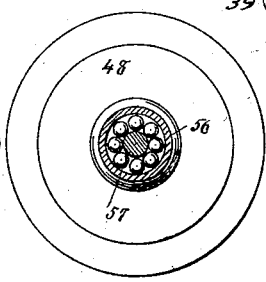

Figure 1 is a plan view of the machine. Fig. 2 is a side elevation thereof. Fig. 3 is a horizontal section through one of the seed boxes or casings and its dropping-wheel. Fig. 4 is a section taken substantially on the line 4 4 of Fig. 3, and Fig. 5 is a section taken on the line 5 5 of Fig. 3. Fig. 6 is a horizontal section through a slightly-modified form of seed box or casing and dropping-wheel. Fig. 7 is a section taken on the line 7 7 of Fig. 6. Fig. 8 is a section on the line 8 8 of Fig. 6. Fig. 9 is a vertical longitudinal section through the bearings of the rolling colter, and Fig. 10 is a transverse section through the same.

In carrying out the invention two frames are employed in the construction of the machine, a main frame A, comprising a rear cross-bar and side bars, which at the front are carried upward and are brought together, or substantially so, and made to clamp the forward end of an upper frame B, which latter is over the central portion of the main frame, extending horizontally from front to rear, and is supported at the rear by suitable brackets or standards C'. A seat 10 is adjustably located upon the upper frame B and may be moved to the front or to the rear or in direction of either of these parts. The axle 11 is a crank-axle, being provided at its center with an arch, and the ground-wheels 12 are mounted upon the straight portions of the axle within the frame A. The axle is adjustably connected with both the lower frame A and upper frame B, in order that it may be carried forward or rearward to properly balance the machine. Each wheel 12 is provided with a sand-cup or its equivalent.

I employ a draft-pole or tongue 14 in the same manner as ordinarily used on vehicles, and the said draft-pole or tongue 14 is secured at the front of the frame B. A doubletree 13 is adjustably fulcrumed on the draft-pole or tongue and either end of the said doubletree can be lengthened or shortened by means of the adjustment to suit the draft applied to each end.

When the team is to be hitched high, the clevis or other device employed is adjustably attached to the end of the doubletree; but when the team is to be hitched low a hitching-bar 15 (shown best in Fig. 2) is adjustably secured to each end of the doubletree, and the team is attached to the lower ends of these bars. The hitching-bars are held in substantially a vertical position by a cable 16, attached to said bars and passed over a friction-roller 17, located upon the under side of the upper frame B. By this means it will be observed that the doubletree serves as an equalizer, since it can be adjusted so as to equalize the draft upon both animals of the team.

At each side of the center of the machine a beam C is horizontally located, extending from the front to the rear, the rear ends of the beams having hinged connection with the rear cross-bar of the said main frame. The said hinge of the end of beam is adjustably attached to the said cross-bar, so as to adjust it to suit the distance between the said beams.

A shaft 18 is journaled in the beams C or in hangers projected downward from the main frame, or it may be journaled in both the beams and the frame. When journaled in the frame, the bearing is so made that the shaft may have vertical movement. This shaft is adapted to carry the seed-dropping mechanism D, comprising a seed box or casing 19 and a dropping-wheel 20, and any desired number of these wheels and casings may be carried upon the same shaft. Ordinarily, however, two are employed, one being placed at each side of the center of the shaft, and this shaft may be rotated so as to change the position of the dropping-wheels or the markers E, when necessary, through the medium of a lever 21, for example, pivoted or loosely mounted upon the central portion of the shaft, having a pin 22 adapted to enter apertures in a disk 23, rigidly attached to the shaft, the handle of the lever 21 being within convenient reach from the driver's seat.

The shaft 18, carrying the seed-dropping mechanism and the markers, may be raised or lowered, when desired, through the medium of hand-levers 24, the said levers being connected with the beams C, and they are pivoted upon collars 26, adjustably mounted upon the side members of the arch of the axle, as shown in Figs. 1 and 2, each sleeve or collar 26 being provided with a rack 27 to be engaged by thumb-latches 28, carried by the said hand-levers. In addition to the hand-levers a foot-lever 29 is likewise employed adjacent to the driver's seat, as shown also in said Figs. 1 and 2.

With reference to the seed-dropping mechanism or devices I have illustrated two forms of casing and dropping-wheel, one form especially adapted for uneven ground being illustrated in Figs. 3, 4, and 5, while the form which is especially adapted for large level fields is illustrated in Figs. 6, 7, and 8.

In the construction of the device shown in Figs. 3, 4, and 5 the seed box or casing 19 is circular and may be of any desired size, being attached by means of a flange 30, or the equivalent thereof, to the beams C. The seed is placed in the box through an opening in the top closed by a cover 31, and the shaft 18 passes loosely through the box. The dropping-wheel 20 is securely fastened to the shaft 18, turning with it. One face of this wheel, the inner face preferably, is in direct communication with the interior of the box 19, and where the wheel is opposed to the casing or box a dust flange or band 32 is formed, preferably upon the wheel, as illustrated in Fig. 3. The wheel is provided with a series of radial channels 33, extending from the periphery in direction of the center of the wheel, the channels being grouped around the center. The inner ends of the channels 33, as shown in Fig. 5, are decidedly curved in an outward direction, or in direction of the periphery of the wheel, and at the lower or inner end portion of each channel a mouth or opening 34 is formed, through which the seed will enter the channels 33 from the box or casing 19, as shown in Figs. 3 and 4, and upon the face of the wheel a glass panel or its equivalent is usually introduced at the lower end of each channel in order that the amount of seed therein may be rendered visible. The channels 33 are also curved to a greater or less extent in the direction of their body.

The mouths or openings 34 are usually formed by introducing a plate 35 over the hub of the dropping-wheel, as shown in Figs. 3 and 4, provided with a flange extending into each mouth, openings being made at the flanged portion of the plate. The quantity of seed to be admitted into each channel is regulated through the medium of a gage-valve 36, one of which is adjustably located in the wheel just above the lower end of each channel, as shown in Fig. 5, extending within the mouth 34, communicating with the channel.

A spiral rib 37 is secured to the hub of the dropping-wheel, revolving therewith, and the said spiral rib is made to fit more or less snugly to the inner face of the casing or box, and serves to feed the seed contained therein to the mouths or openings 34 in the drop-wheel.

A furrow-opener or hill-former 38 is bolted or otherwise adjustably secured to the outer face of the drop-wheel at or near each channel, and between each of these furrow-openers or hill-formers, which are in the nature of a share, as shown in Figs. 3 and 4, a straight blade or pointed bar 39 is attached to the wheel, which in a measure serves to cover the seed when dropped and likewise to mark the hill where the seed has been placed. The beams C, supporting the seed-dropping mechanism, are adjustable in order that they may be moved to suit the distance between the rows to be planted.

The seed-dropping mechanism shown in Figs. 6, 7, and 8 differs slightly from that shown in Figs. 3, 4, and 5. The casing 19$^a$ is virtually an integral portion of the dropping-wheel 20, and the spiral rib 37 is therefore formed directly upon the inner face of the casing. Similar channels 33 are provided in the face of the wheel, but each channel is provided at its outer end with an adjustable tubular furrow-opener or hill-former 38$^a$, and pointed bars or teeth 39$^a$ are located between the furrow-openers. The various mouths for the channels 33 are formed through the medium of a plate 40, having peripheral recesses 41, and more or less seed is admitted according as the recesses are brought in greater or less registry with the channels, and the seed-supply is entirely cut off when the solid surfaces of the plate are brought over the said channels. It will be understood that the lower portions of the channels in both forms of the seed-dropping mechanism only are in communication with the seed in the box or casing, and the furrow-openers or hill-formers are lengthened or shortened as required by the distance between the hills in planting.

A marker E is connected with each end of the dropping-shaft 18 through the medium of flexible shafts 42, coupled in any approved manner to the said dropping-shaft, the marking-shafts being so made in order that they may spring to a greater or less extent should the marker contact with a stone or other unyielding object, and thereby prevent breakage of the machine. The marker consists of a disk 43, from which a series of spokes 44 is made to radiate, controlling the distance that the marker shall enter the ground, and a casing 45 is secured upon the disk, extending across the center from top to bottom, and within this casing at each side of the center a spring 46 is placed, attached at its inner end to a fixed support and at its outer end to a broad marking-blade 47, and the said marking-blade is made in two sections, as shown in Fig. 1, in order that it may be lengthened or shortened.

Colters 48 are adjustably attached to an extension 49 of the main beam C, as shown in Fig. 1. These colters stand diagonally, one in front of each of the seed-dropping wheels, and serve to pulverize the ground and likewise to clear weeds from the path of the wheels, and a harrow-tooth 50 is likewise carried by each extension 49 of the beam, also utilized for pulverizing the ground.

A gage-wheel 51 is located at the rear of each dropping-wheel and is so placed that it regulates the path that the plowshares or furrow-formers carried by the wheel shall enter the ground, and, furthermore, by reason of the position of the rear gage-wheel it serves also to cover up the seed, since it stands diagonally across the dropping-wheel, inclining in a direction opposite to that of the colter.

It will be understood that any equivalent of the forward colter—for example, a plowshare, or a cultivator, or a harrow—may be attached to the beam, if desired.

The markers are so constructed that they may be adjusted to large or to small planting-wheels. With reference to the action of the marker, one marker will mark the field one row in advance, and the marker on the opposite side of the machine will travel in the row previously marked, thereby enabling the operator to readily see how to drive in order to plant the corn equal distances apart. When the seed drops, the marking arm or blade will strike the ground and mark any cross-line of the planting row.

Guards 52 are attached at their ends to each beam C and extend over and protect the dropping-wheels 20, while covers 53 are attached at their ends to the main frame A and embrace the peripheries of the wheels 20 and prevent the entrance of dust to the mouths or openings 34 of the seed-channels 33.

The spindle of the colter 48 is journaled in a suitable box 56, and said box is constructed to receive a number of balls 57, which are grouped around and have bearing upon the colter-spindle, as shown in Fig. 9. Under this construction the colter will run freely and will not need oiling.

Having thus described my invention, I claim as new and desired to secure by Letters Patent—

1. The combination of a frame, having a cross bar, horizontal beams having one end adjustably hinged to said cross bar and carrying the planting devices, an axle mounted on the frame, a sleeve adjustably mounted on the axle, and provided with a rack, and a lever having a latch to engage said rack, said lever being pivoted to the sleeve and connected to and adapted to actuate the horizontal beams, substantially as set forth.

2. The combination of a frame having a cross bar, horizontal beams adjustably hinged to said cross bar, a shaft rotatively mounted on said beams and carrying the seed dropping mechanism, a gage-wheel mounted on each beam behind each seed dropping mechanism, markers mounted on the shaft of the seed dropping mechanism, means for adjusting the seed dropping mechanism and markers, an axle mounted on the frame and provided with a central arched portion, sleeves adjustably pivoted on the arched portion of the axle and provided with racks, and levers pivoted on the sleeves and provided with latches to engage the racks, said levers being coupled to the horizontal beams and being adapted for vertical and horizontal movement, substantially as set forth.

3. The combination of a support having a perforated lower end provided in one side with a groove concentric with its perforation, a series of balls located in the said groove, a colter having a spindle to engage and pass through said perforation and provided with a groove concentric with the groove in the support and a nut on the extremity of the spindle, substantially as set forth.

4. The combination of a main frame, an upper frame comprising parallel longitudinal side bars connected at opposite ends to the front and back part of the main frame, a crank axle having straight ends adjustably secured to the main frame and having an arched central portion adjustably connected to the upper frame, and a seat adjustably secured to and adapted to slide along the side bars of the upper frame, substantially as set forth.

5. In a planter, a seed distributing mechanism, the same consisting of a seed box, a drop wheel adjoining said box and provided with seed distributing channels curved at their inner ends, and gage valves, substantially as shown and described, for regulating the amount of seed fed from the box to the said channels, as and for the purpose set forth.

6. In a planter, a seed distributing mechanism, the same consisting of a seed box provided with a spiral feed, a seed distributing wheel held to revolve adjacent to the said box and having communication therewith, the said wheel being provided with channels extending from a point near its center out through its periphery, the inner ends of the channels being more or less curved in an outwardly direction, and gage valves regulating the communication between the said channels and the said seed box, substantially as and for the purpose specified.

7. In a planter, a seed distributing mechanism, the same consisting of a seed box, a seed distributing wheel held to revolve adjacent to the said box, and provided with discharge channels radiating from a point near its center and extending out to the periphery, the inner ends of the said channels being curved in an outwardly direction, gage valves regulating the width of the opening through which communication is established between said channels and the seed box, and furrow openers or hill formers carried by the said wheel and extending beyond its periphery, one adjacent to each channel, as and for the purpose specified.

8. In a planter, a seed distributing mechanism, the same consisting of a seed box provided with a feed, a seed distributing wheel held to revolve adjacent to the box, being in communication therewith, seed discharge or distributing channels produced in the said wheel and extending from a point near the center out through the periphery, the inner ends of said channels being curved in an outwardly direction, or returned upon themselves, means for regulating the opening connecting the channels with the seed box, and tubular furrow openers or hill formers communicating with the said channels, as and for the purpose specified.

ANDERS MATSON.

Witnesses:
ANDROV G. BURGSTONE,
ERIC GUSTUS.